United States Patent
Kegel

(10) Patent No.: US 9,063,891 B2
(45) Date of Patent: Jun. 23, 2015

(54) SECURE COMPUTER SYSTEM FOR PREVENTING ACCESS REQUESTS TO PORTIONS OF SYSTEM MEMORY BY PERIPHERAL DEVICES AND/OR PROCESSOR CORES

(71) Applicant: ADVANCED MICRO DEVICES, INC., Sunnyvale, CA (US)

(72) Inventor: Andrew G. Kegel, Redmond, WA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 141 days.

(21) Appl. No.: 13/719,671

(22) Filed: Dec. 19, 2012

(65) Prior Publication Data
US 2014/0173236 A1 Jun. 19, 2014

(51) Int. Cl.
G06F 13/00 (2006.01)
G06F 12/14 (2006.01)
G06F 21/78 (2013.01)
G06F 21/60 (2013.01)
G06F 12/10 (2006.01)

(52) U.S. Cl.
CPC ............ *G06F 12/1441* (2013.01); *G06F 21/78* (2013.01); *G06F 21/604* (2013.01); *G06F 12/1081* (2013.01)

(58) Field of Classification Search
CPC ..... G06F 21/604; G06F 21/606; G06F 21/78; G06F 21/85; G06F 12/1416; G06F 12/1483; G06F 21/51; G06F 2221/2147
See application file for complete search history.

(56) References Cited

U.S. PATENT DOCUMENTS

| | | | |
|---|---|---|---|
| 6,212,635 B1 * | 4/2001 | Reardon ........................ | 711/164 |
| 6,321,314 B1 * | 11/2001 | Van Dyke ..................... | 711/163 |
| 7,685,436 B2 * | 3/2010 | Davis et al. ................... | 713/193 |
| 2007/0011419 A1 * | 1/2007 | Conti ............................ | 711/163 |
| 2007/0266438 A1 * | 11/2007 | Rodgers et al. ................ | 726/26 |
| 2009/0183245 A1 * | 7/2009 | Simpson et al. ................. | 726/7 |
| 2013/0067245 A1 * | 3/2013 | Horovitz et al. ............. | 713/193 |
| 2013/0117803 A1 * | 5/2013 | Markham et al. ................ | 726/1 |

* cited by examiner

*Primary Examiner* — Aimee Li
*Assistant Examiner* — Jason Blust
(74) *Attorney, Agent, or Firm* — Park, Vaughan, Fleming & Dowler LLP

(57) ABSTRACT

A computer system is provided for preventing peripheral devices and/or processor cores from accessing restricted portions of system memory. For example, the computer system can include a host bridge, system memory coupled to the host bridge via a first access bus, a security processor coupled to the host bridge via a memory access bus that allows the security processor to access system memory and to access the peripheral device, and a security processor memory management unit (SPMMU) coupled between the peripheral device and the host bridge. The security processor is configured to program the SPMMU via the memory access bus to specify a first restricted range of physical addresses in the system memory that the peripheral device is not permitted to access. The SPMMU can then process access requests from the peripheral device and deny access requests that are determined to be within the first restricted range.

19 Claims, 3 Drawing Sheets

SECURE COMPUTER SYSTEM FOR PREVENTING ACCESS REQUESTS TO PORTIONS OF SYSTEM MEMORY BY PERIPHERAL DEVICES AND/OR PROCESSOR CORES

TECHNICAL FIELD

Embodiments of the subject matter described herein relate generally to computer systems. More particularly, embodiments of the subject matter relate to a secure computer system and related methods for preventing peripheral devices and/or processor cores from accessing portions of system memory.

BACKGROUND

In modern computer systems, processors (or CPUs) and peripheral devices (e.g., everything else) are the two entities that attempt request access to system memory (i.e., authorization to read data from system memory or permission to write data to system memory). Examples of peripheral devices include input/output hardware devices including graphics cards, network cards, sound cards, disk drive controllers, off-load controllers, USB controllers, etc.

To process (e.g., check and translate) these access requests, two functional memory management units (MMUs) are typically utilized.

With respect to access requests that originate from a processor, a "regular" MMU checks and translates requests from the processor to access system memory.

With respect to access requests that originate from a peripheral device, in most cases, an input/output memory management unit (IOMMU) checks and translates requests from the peripheral device to access system memory. However, in some cases, the peripheral device is allowed to access system memory directly.

For example, Direct Memory Access (DMA) refers a commonly used technique that allows a CPU and peripheral devices to share system memory. DMA allows a peripheral device in a computer system to access system memory and perform data transfers between that peripheral device and system memory. In other words, DMA allows a peripheral device to transfer data without the help of the CPU, and therefore this type of data transfer is known as a direct memory access. For example, DMA allows peripheral devices to read from and/or write to system memory independently of the CPU. While a peripheral device is performing the DMA, the CPU can engage in other operations.

It would be desirable to provide a computer system that has improved security. For example, it would be desirable to prevent peripheral devices and/or processor cores of a CPU from accessing portions of system memory that are not to be accessed by those devices.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure

BRIEF SUMMARY OF EMBODIMENTS

One drawback of many conventional computer systems is that system memory can be intentionally or accidentally corrupted or viewed by peripheral devices or by software running on a processor core of the computer system. In either case, this leads to system instability, denial-of-service, introduction of viruses, or the revealing of secrets (e.g., encryption keys).

In some cases, it would be desirable to protect a portion (or portions) of system memory from being accessed by peripheral devices using direct-memory access (DMA), and/or by processor cores of a CPU. In other cases, such as trusted or secure software, for example, it would be desirable to provide a range of memory that can only be accessed by secure hardware and/or processor cores of a CPU.

In accordance with some of the disclosed embodiments, a computer system is provided. The computer system includes a peripheral device, a host bridge, system memory, a security processor and a security processor memory management unit coupled between the peripheral device and the host bridge. System memory coupled to the host bridge via a first access bus, and the security processor is coupled to the host bridge via a memory access bus that allows the security processor to access system memory and the peripheral device. The security processor memory management unit is configured to program the security processor memory management unit via the memory access bus to specify a first restricted range of physical addresses in the system memory that the peripheral device is not permitted to access. The security processor memory management unit is configured to process access requests, from the peripheral device, to access system memory, and determine whether addresses specified in the access requests from the peripheral device are within the first restricted range. The security processor memory management unit is configured to deny the ones of the access requests from the peripheral device that are determined to be within the first restricted range.

In accordance with some of the disclosed embodiments, a computer system is provided. The computer system includes a host bridge, system memory coupled to the host bridge via a first access bus, a processor comprising a processor core, a security processor and a security processor memory management unit. The security processor is coupled to the host bridge via a memory access bus that allows the security processor to access system memory, and is coupled to the processor core via a management bus. The security processor memory management unit is coupled between the processor core and the host bridge via a memory access bus, and coupled to the security processor by a control bus. The security processor is configured to program the security processor memory management unit via the control bus to specify at least one restricted range of physical addresses in the system memory that the processor core is not permitted to access. The security processor memory management unit is configured to process access requests, from the processor core, to access system memory, and determine whether addresses specified in the access requests from the processor core are within the restricted range. The security processor memory management unit is configured to deny the ones of the access requests from the processor core that are determined to be within the restricted range.

In accordance with other disclosed embodiments, a method is provided for preventing peripheral devices and/or processor cores from accessing portions of system memory.

In accordance with other disclosed embodiments, a computer-implemented method is provided for configuring a computer system to prevent access to a restricted range of physical addresses in a system memory of the computer system. In accordance with the computer-implemented method, a security processor generates a first signal during initialization of the computer system. The first signal is communicated to a processor core and causes the processor core to enter a stall mode such that the processor core is not permitted to access a host bridge that couples the processor core to the system memory. The security processor can then configure the restricted range of physical addresses in the system memory. The security processor can then program a first security processor memory management unit to specify at least some of physical addresses in the restricted range of physical addresses that a peripheral device is not permitted to access, and can program a second security processor memory management unit to specify at least some of physical addresses in the restricted range of physical addresses that the processor core is not permitted to access. Once programming is complete, the security processor can then generate a second signal that is communicated to the processor core that releases the processor core from the stall mode so that the processor core is permitted to access the host bridge that couples the processor core to the system memory.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
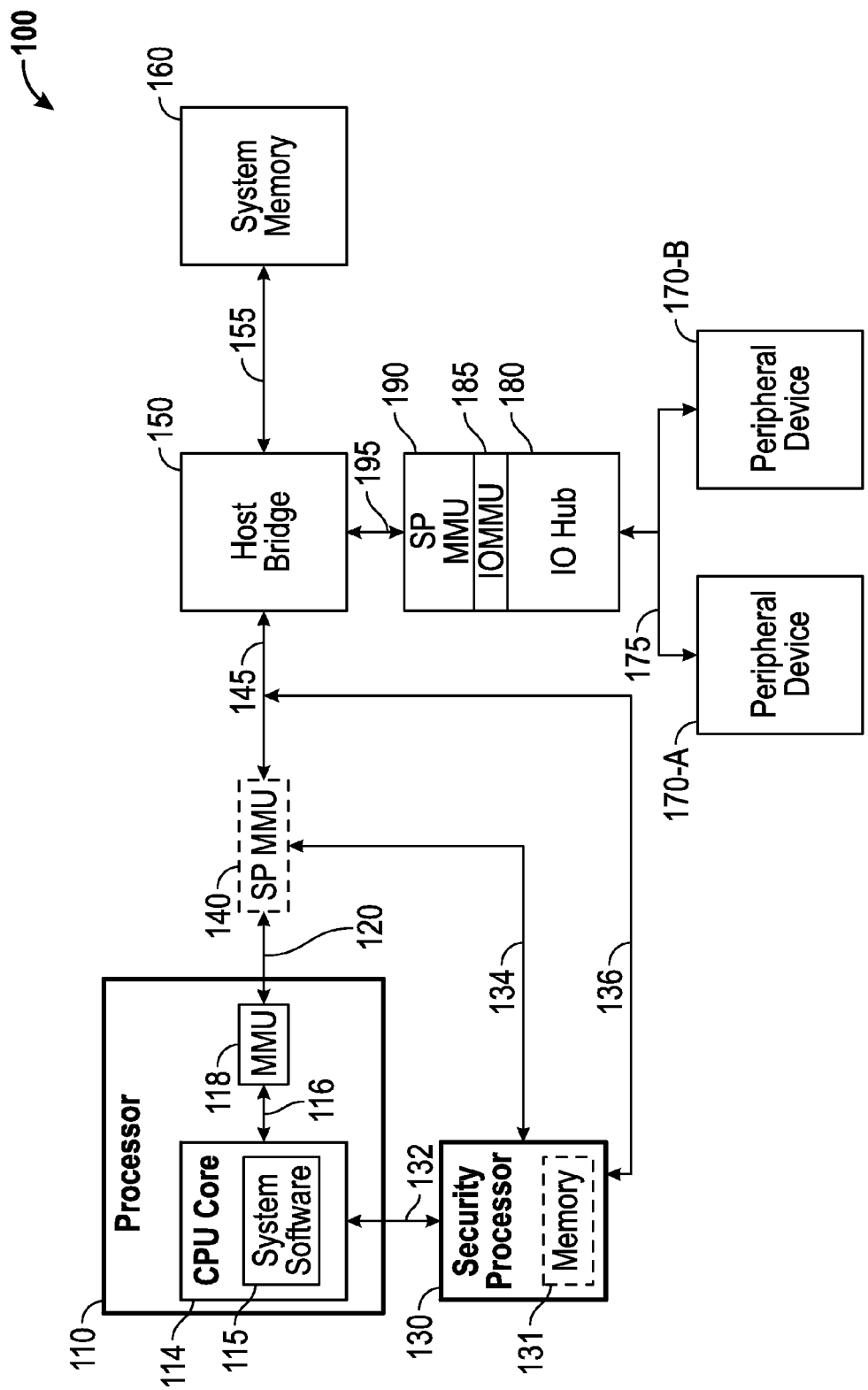
FIG. 1 is a simplified block diagram of an enhanced secure computer system 100 in accordance with some of the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

For the sake of brevity, conventional techniques related to accessing system memory in a computer system, and other functional aspects of the devices and computer systems (and the individual operating components of the devices and computer systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. In addition, certain terminology may also be used in the following description for the purpose of reference only, and thus are not intended to be limiting. For example, terms such as "first," "second," and other such numerical terms referring to elements or features do not imply a sequence or order unless clearly indicated by the context.

FIG. 1 is a simplified block diagram of an enhanced secure computer system 100 in accordance with some of the disclosed embodiments.

The computer system 100 includes a processor 110, a security processor (SP) 130, a first SP memory management unit (MMU) 140, a host bridge 150, a system memory 160, a plurality of peripheral devices 170, an input/output (IO) hub 180, an input/output memory management unit (IOMMU) 185, a second SP MMU 190 and a plurality of buses that couple various components of the computer system 100 together.

These buses can include, for example, a processor virtual address bus 116, a processor physical address bus 120, a management bus 132, a SP control bus 134, a SP memory access bus 136, a processor memory access bus 145, a system memory access bus 155, an input/output bus 175 and an input/output memory access bus 195. In general, the buses may be any of several types of bus structures including a memory bus or memory controller, a peripheral bus, and a local bus using any of a variety of bus architectures. By way of example, and not limitation, such architectures include Peripheral Component Interconnect (PCI) bus (also known as Mezzanine bus), Peripheral Component Interconnect express (PCIe) bus, a HyperTransport (HT) bus, an Industry Standard Architecture (ISA) bus, a Micro Channel Architecture (MCA) bus, an Enhanced ISA (EISA) bus, a Video Electronics Standards Association (VESA) local bus, etc. For instance, in one non-limiting implementation, the SP memory access bus 136 and the processor memory access bus 145 can be implemented using a HT bus, the input/output bus 175 can be implemented using PCIe bus, and the input/output memory access bus 195 can be implemented using a PCIe bus or a HT bus.

The processor 110 includes at least one processor core 114. In some implementations, the processor 110 is a multi-core processor that includes a plurality of the processor cores 114 (e.g., a plurality of x86 processor cores). As is well-known in the art, a multi-core processor is a single computing component with two or more independent central processing units (CPUs) (called "processor cores"), which are the units that read and execute program instructions. The instructions are ordinary CPU instructions, but the multiple processor cores can run multiple instructions at the same time, increasing overall speed. Each processor core 114 can include a central processing unit (CPU) and other elements such as data cache memory, a memory controller, etc. Each processor core 114 also has a memory management unit (MMU) 118 associated therewith. The processor core 114 communicates information (e.g., access requests that specify virtual addresses) with the MMU 118 over the processor virtual address bus 116, and the MMU 118 communicates information (e.g., access requests that specify physical addresses in system memory 160 that are sought to be written to in system memory 160 or read from system memory 160) with the host bridge 150 over the processor memory access bus 145.

The MMU 118 is a computer hardware component that handles access requests from the processor core 114 to access system memory 160. One of the main functions of the MMU 118 is virtual memory management (i.e., translation of virtual memory addresses to their corresponding physical memory addresses). Virtual memory addresses are those unique to the accessing process. Physical memory addresses are those unique to the processor core 114. An OS assigns each process its own virtual memory address space, and the MMU 118 divides the virtual memory address space (the range of addresses used by the processor) into pages. The MMU 118 can translate virtual page numbers to physical page numbers via an associative cache called a Translation Lookaside Buffer (TLB). A translation lookaside buffer (TLB) is a cache of recently used mappings from the operating system's page table that MMU 118 hardware uses to improve virtual memory address translation speed. When a virtual memory address needs to be translated into a physical memory address, the TLB is searched first. A TLB has a fixed number of slots that contain address translation entries, which map virtual memory addresses to physical memory addresses. When the processor core 114 attempts to access memory (e.g., attempts to fetch data or an instruction located at a particular virtual memory address or attempts to store data to a particular virtual memory address), the virtual memory address must be translated to a corresponding physical memory address. When the TLB lacks a translation, a slower page table mechanism is used. As used herein, the term "page table" refers to a data structure used by a virtual memory system in an operating system to store the mapping between virtual memory addresses and physical memory addresses. Page tables are used to translate the virtual memory addresses seen by the application program into physical memory addresses (also referred to as "real addresses") used by the hardware to process instructions. From the page table, the MMU 118 looks up the real address corresponding to a virtual memory address, and passes the real address to the parts of the processor core 114 which execute instructions. The data found in such page tables are typically called page table entries (PTEs). As used herein the term "page table entry" refers to an entry in a page table that includes a mapping for a virtual page to either (1) the real memory address at which the page is stored (e.g., at RAM), or (2) an indicator that the page is currently held in auxiliary memory (e.g., a hard disk file). A PTE or TLB entry may also include information about whether the page has been written to (the dirty bit), when it was last used (the accessed bit, for a least recently used page replacement algorithm), what kind of processes (user mode, supervisor mode) may read and write it, and whether it should be cached. When a TLB entry or PTE prohibits access to a virtual page (e.g., because no physical random access memory has been allocated to that virtual page and the page tables indicate that the virtual memory page is not currently in real memory), the MMU 118 signals a page fault exception (special internal signal) to the processor core 114 which invokes the OS's paging supervisor module. The OS then handles the situation, perhaps by trying to find a spare frame of RAM and set up a new PTE to map it to the requested virtual memory address. If no RAM is free, it may be necessary to choose an existing page, using some replacement algorithm, and save it to disk. With some MMUs 118, there can also be a shortage of PTEs or TLB entries, in which case the OS will have to free one for the new mapping. One benefit of an MMU 118 is memory protection: an OS that executes at the processor core 114 can use it to protect against errant programs, by disallowing access to system memory 160 that a particular program should not have access to. Typically, an OS assigns each program its own virtual address space.

It is noted that in some implementations, the processor core 114 and the MMU 118 can be implemented in the same integrated circuit, whereas in other implementations the MMU 118 can be implemented in its own dedicated integrated circuit.

The host bridge 150 provides an interconnection point between the processor 110, the peripheral devices 170 and the system memory 160, and handles communications among the processor 110, the peripheral devices 170 and the system memory 160, including access requests by the processor core(s) 114 and the peripheral devices 170. Access requests include requests to read information from the system memory 160 and requests to write information to the system memory 160. Through the host bridge 150, the peripheral devices 170 can directly access the system memory 160 using DMA techniques. The host bridge 150 also provides data access mappings between the processor core 114 and peripheral devices 170. The host bridge 150 maps every peripheral device 170 to the host address domain so that the processor core(s) 114 can access the peripheral devices 170 through the host bridge 150.

The system memory 160 (also referred to as "physical memory") is hardware device used to store programs (sequences of computer executable instructions) or data (e.g. program state information) on a temporary or permanent basis. The system memory 160 includes computer-readable storage media in the form of nonvolatile memory such as dynamic random access memory (DRAM). DRAM typically contains data and/or program modules that are immediately accessible to and/or presently being operated on by the processor 110. By way of example, and not limitation, an operating system, application programs, other program modules, and program data can be stored at system memory 160.

The peripheral devices 170 communicate information with the input/output hub 180 over the input/output bus 175. This allows the peripheral devices 170 to access at least a portion of system memory 160 via the input/output bus 175, the input/output memory access bus 195 and the system memory access bus 155. The peripheral devices 170 are capable of performing DMA transactions and can access the system memory 160 using a DMA access technique. For simplicity of the illustration, only two peripheral devices peripheral devices 170 are shown; however, the computer system computer system 100 may include any number of peripheral devices. The peripheral devices peripheral devices 170 can also referred to as "physical devices." Examples of peripheral devices include audio/video devices, network interface devices, printers, graphics modules, etc.

The IOMMU 185 is a special memory management unit (MMU) that resides on the input/output (I/O) path connecting the peripheral devices 170 to the system memory 160. The IOMMU 185 manages address translations, and translates addresses used in DMA transactions and protects system memory from illegal access by I/O devices (also referred to as peripheral devices). Like the MMU 118, which translates CPU-visible virtual addresses to physical addresses, the IOMMU 185 takes care of mapping device-visible virtual addresses (also called device addresses or I/O addresses in this context) to physical addresses. In other words, the IOMMU 185 maps the device address space (e.g., a bus address) that is relevant to the I/O bus into the physical address space (e.g., a host physical address) that is relevant to the memory bus. The IOMMU may also include extra information associated with the address space mapping such as read and write permissions. Some units also provide memory protection from misbehaving devices. Its noted that in this particular embodiment, the IOMMU 185 is illustrated as being integrated in the input/output hub 180; however, this is simply one non-limiting implementation, and in other architectures the IOMMU 185 can be implemented as its own separate hardware block, and the input/output hub 180 can communicate information with the IOMMU 185 over a separate bus (not illustrated).

One function of the IOMMU 185 is to check and translate each memory access by a peripheral device 170. The IOMMU 185 translates the address supplied by one of the peripheral devices 170 from a virtual address to a physical address and checks that the access is allowed. For example, the IOMMU 185 can assign each peripheral device 170 (sometimes also referred to as an I/O device in the current IOMMU specification) a specific domain and a distinct set of I/O page tables. When peripheral device 170 attempts to read or write system memory 160, the IOMMU 185 intercepts the access, determines the domain to which the peripheral device 170 has been assigned, and uses the TLB entries associated with that domain or the I/O page tables associated with that peripheral device 170 to determine whether the access is to be permitted as well as the actual location in system memory 160 that is to be accessed. The IOMMU 185 may optionally include support for remote IOTLBs, which can allow a peripheral device 170 with IOTLB support to cooperate with the IOMMU 185 to maintain its own cache of address translations.

In normal operation, the IOMMU 185 would be programmed by system software 115 that runs at the processor core 114 (such as hypervisor or operating system software) to allow a peripheral device to access only certain portions of the system memory 160 that it is allowed to access, and prevents that peripheral device from accessing other portions of the system memory 160. In other words, the system software 115 can present the peripheral device from accessing portions of the system memory 160 that should be kept secure. The system software 115 can also program the MMU 118 to prevent other software that is executing at the MMU 118 from accessing certain restricted portions of the system memory 160. As such, the security of the system computer system 100 depends on the proper design and operation of the system software 115 that controls access to certain portions (or ranges) of the system memory 160. Unfortunately, there is currently no hardware mechanism to guarantee that the peripheral devices 170 are limited to accessing only certain portions (or ranges) of the system memory 160.

Security Enhancements

In accordance with the disclosed embodiments, to improve security, the secure computer system 100 includes a security processor (SP) 130 (also referred to as a programmable security processor (PSP)), a first SP MMU block 140 (that is optional), and a second SP MMU block 190.

As a preliminary matter, it is noted that in this particular embodiment, the second SP MMU block 190 is illustrated as being integrated with the IOMMU 185 in the input/output hub 180 (e.g., the functionality of the second SP MMU block 190 can be implemented within the IOMMU 185). However, this is simply one non-limiting implementation. In other architectures, the second SP MMU block 190 can be implemented as its own separate hardware block that is independent of the IOMMU 185 and the input/output hub 180, and can communicate information with the IOMMU 185 over a separate bus (not illustrated). Alternatively, in another embodiment, the second SP MMU block 190 and IOMMU 185 can be implemented as a separate hardware block that is independent of the input/output hub 180, and that can communicate information with the input/output hub 180 over a separate bus (not illustrated). In addition, although FIG. 1 illustrates one instance of the input/output hub 180, the IOMMU 185, the second SP MMU block 190 and the bus 195, it will be appreciated that in other implementations that multiple instances of each can be provided to provide more IO capability (slots) in a system. In such implementations, the host bridge 150 can have multiple input ports. Each input port can be coupled to a bus, like bus 195, to accommodate a branch that includes an input/output hub, IOMMU and second SP MMU block. In a system that has a plurality of input/output hubs 180, where each input/output hub is connected to a separate set of peripheral devices, then each input/output hub can have its own instance of the second SP MMU. In addition, in some embodiments, multiple instances of the second SP MMU 190 block can be implemented within the IO hub 180 and/or IOMMU 185. For example, another instance of the second SP MMU 190 can be implemented if more than one protected area of memory 160 is required.

As illustrated in FIG. 1, the security processor 130 is coupled to the processor core 114 via a management bus 132 that can be used to control the processor core 114. In other words, the security processor 130 can directly control or manage the CPU processor core(s) 114 using the management bus 132.

In this embodiment, the security processor 130 is also coupled the first SP MMU block 140 by the SP control bus 134 giving the security processor 130 a path that allows it to program the first SP MMU block 140. This way security processor 130 can control and program the first SP MMU block 140 via the SP control bus 134.

The security processor 130 is also coupled to the host bridge 150 via a SP memory access bus 136. The SP memory access bus 136 allows the security processor 130 to connect to and access system memory 160, peripheral devices 170 and the IOMMU 185 since the SP memory access bus 136 bypasses the first SP MMU block 140. The security processor 130 can also control and program the second SP MMU block 190 via the SP memory access bus 136.

The security processor 130 is a processor, and therefore needs memory to operate. In one embodiment, the memory for the security processor 130 can be connected exclusively to the security processor 130, and in one particular implementation, the memory 131 can be integrated in the same integrated circuit package as the security processor 130. In another embodiment, the memory for the security processor 130 can be a reserved portion of the system memory 160 that is reserved for the exclusive use by the security processor 130. To maintain system integrity, the reserved portion of system memory 160 must be protected from corruption by the peripheral devices 170 and/or by other software running at the processor 110.

Operation of the Security Processor During Configuration of System Memory and Programming of the SP MMU(s)

Figure 2:
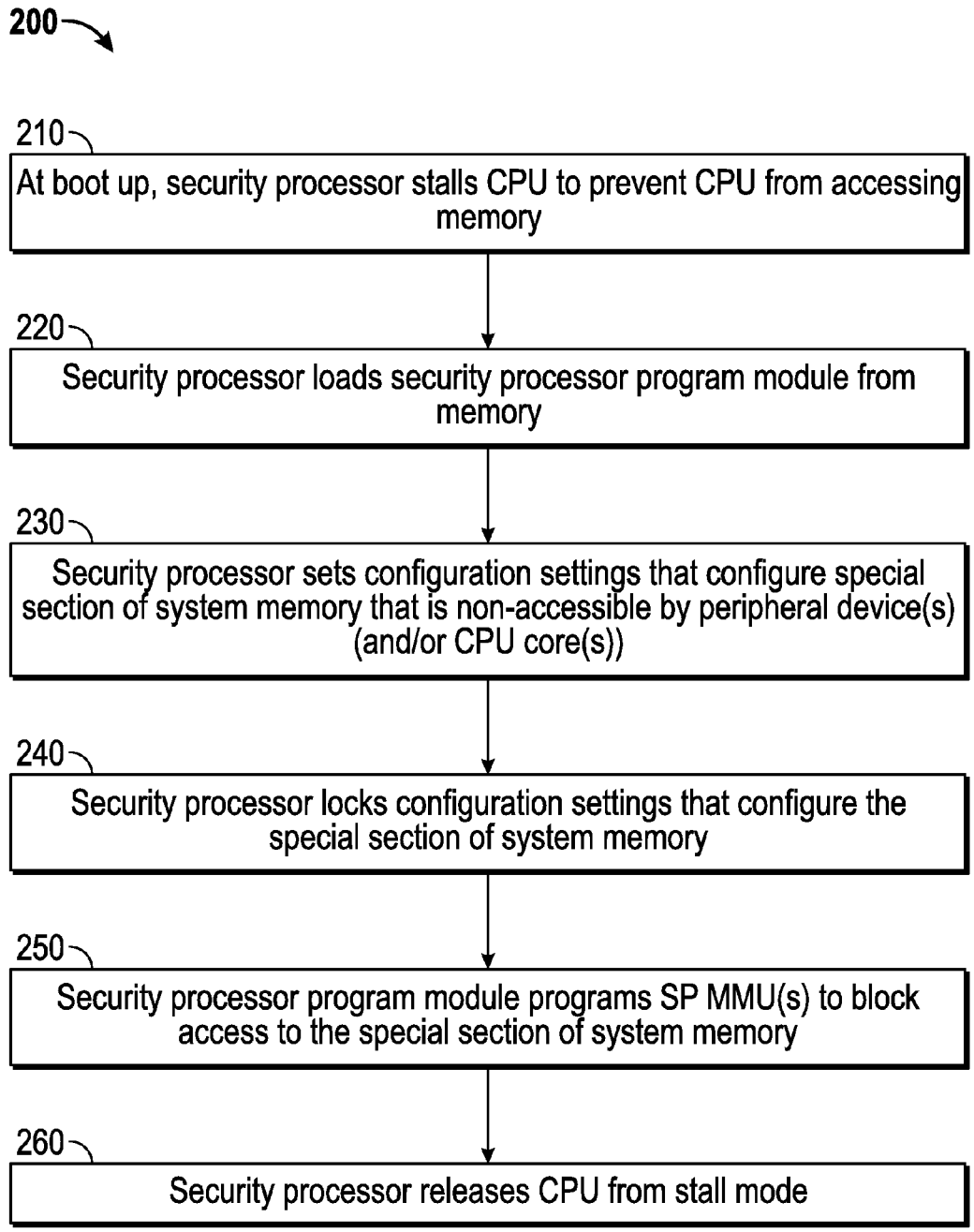
FIG. 2 is a flowchart that illustrates a method of operating a security processor during configuration of system memory and programming of security processor memory management units (SP MMUs) in accordance with some of the disclosed embodiments.

FIG. 2 is a flowchart that illustrates a method of operating the security processor 130 during configuration of system memory 160 and programming of the SP MMU(s) 120, 190 in accordance with some of the disclosed embodiments. FIG. 2 will now be described with reference to FIG. 1.

At 210, during initialization of the computer system hardware (e.g., at boot up), the CPU 110 is stalled to prevent the CPU 110 from setting any configuration settings and accessing system memory 160. When a reset or restart signal is sent to the computer system's hardware, the hardware responds by performing an initialization sequence that prepares the hardware to start executing software instructions. After the initialization, and before the computer system's hardware starts executing software instructions, the CPU 110 (and its processor core(s) 114) are stalled to prevent the processor core(s) 114 from executing any instructions that may be read from system memory 160. This way, the security processor 130 gains control of the system 100 before the processor core(s) 114, and can program the first SP MMU block 140 and the second SP MMU block 190 before the peripheral devices 170 and/or the processor core(s) 114 can attempt to access system memory 160. The CPU core 114 will remain in a stalled state until the security processor 130 releases it. In other words, the stall will not end until software at the security processor 130 un-stalls the CPU core(s) 114. The stall and release control can be implemented via a flip-flop in the security processor 130 or via a bit in a register in the security processor 130. The flip-flop or register bit will set to "stall" when a system reset signal is received (e.g., at power-up). In some embodiments, the security processor 130 stalls and un-stalls the CPU 110 by asserting a stall control signal and a release control signal over the management bus 132.

At 220, the security processor 130 loads a security processor program module from memory. The "memory" at 220 can be one of several different memory sources depending on the implementation. In one embodiment, the security processor program module may be stored at non-volatile memory (e.g., a separate flash memory module) that holds the BIOS image that eventually runs on the core 114. In one implementation, this memory can be implemented on the motherboard (not illustrated) of the system. In another embodiment, the security processor program module may be stored at non-volatile memory 131 that can be implemented in the same integrated circuit as the security processor 130. In another implementation, the security processor program module may be stored at non-volatile memory (not illustrated here) that can be implemented elsewhere within the system 100, such as within a separate memory module,.

At 230, the security processor 130 sets configuration settings that configure at least one special section of system memory that is non-accessible by peripheral device(s) 170 and/or CPU core(s) 114. The special section of system memory is a restricted range (or ranges) of physical addresses in system memory 160 for which access requests from peripheral devices 170 (and/or CPU cores 114) will be blocked or denied such that only the security processor 130 can access that restricted range (or ranges) of physical addresses in system memory 160.

At 240, the security processor 130 locks configuration settings that configure the special section of system memory 160. By locking the configuration settings so that they cannot be changed, the security processor 130 prevents changes to the configuration settings by software running on CPU core(s) 114 or by peripheral device(s) 170 .

At 250, the security processor program module that was loaded (at 220) into the security processor 130 programs at least one of the SP MMU blocks 140, 190 to block access to the special section of system memory 160.

For example, in some implementations, such as in a system 100 in which the security processor 130 trusts the software running on the processor core(s) 114, the security processor 130 does not implement the first SP MMU block 140, and therefore only programs the second SP MMU block 190 to block one or more of the peripheral devices 170 from accessing (i.e., reading from or writing to) the special section of system memory 160. In such implementations, the processor core(s) 114 are still allowed to access the special section of system memory 160. As will be described below, the security processor 130 can program the second SP MMU blocks 190 using an inverted exclusion range mechanism to specify which the special section of system memory 160. This protects the special section of the system memory 160 from DMA access requests by the peripheral devices 170.

However, in other implementations, if the security processor 130 does not trust the processor core(s) 114, then the additional SP MMU block 140 can also be implemented along with the SP control bus 134, and the security processor 130 also programs the first SP MMU block 140 to block the processor core(s) 114 from accessing (i.e., reading from or writing to) the special section of system memory 160. This protects the special section of the system memory 160 from access requests by the processor core(s) 114.

At 260, the security processor 130 releases the CPU 110 so that system software 115 executing at the processor core(s) 115 can access system memory 160 and set other configuration settings at MMU 118 and at the IOMMU 185.

Operation of the SP MMU(s)

The first SP MMU block 140 is optional and is not used in all embodiments. However, when the first SP MMU block 140 is implemented and has been configured by the SP 110, when the system 100 begins operating normally, the first SP MMU block 140 will process requests, from the CPU core 114, to access system memory 160, and determine whether or not the addresses specified in those requests are within the restricted range(s). Any requests that are within the restricted range(s) will be blocked or denied by the first SP MMU block 140, and the CPU core 114 will not be allowed to read from or write to the physical address specified in that request. Any other requests (i.e., that are not within the restricted range(s)) will be allowed or permitted by the first SP MMU block 140 (i.e., the CPU core 114 will be allowed to read from or write to the physical address specified in that request).

After the second SP MMU block 190 has been configured/programmed by the SP 110, and the system 100 begins operating normally, the second SP MMU block 190 will process requests, from the peripheral devices 170, to access system memory 160, and determine whether or not the addresses specified in those requests are within the restricted range(s). Any requests that are within the restricted range(s) will be blocked or denied by the second SP MMU block 190, and the peripheral device will not be allowed to read from or write to the physical address specified in that request. Any other requests (i.e., that are not within the restricted range(s)) will be allowed or permitted by the second SP MMU block 190 (i.e., the peripheral device will be allowed to read from or write to the physical address specified in that request).

Exclusion Range

In one implementation the IOMMU 185 is compliant with a specification for IOMMU technology in the HyperTransport™ architecture by Advanced Micro Devices, Inc. This specification is titled "AMD I/O Virtualization Technology (IOMMU) Specification Revision 1.26," February, 2009, which is incorporated by reference herein in its entirety, and for sake of brevity will be referred to below as the "current IOMMU specification."

The current IOMMU specification describes an "exclusion range" mechanism. The exclusion range mechanism allows for a range of physical addresses in system memory to be defined at the IOMMU; this range of addresses is referred to as an exclusion range. That portion of the system memory is "excluded" from being blocked by other configuration settings in the IOMMU. To explain further, the IOMMU 185 allows a peripheral device 170 to directly access to a portion of system memory 160, that is defined by the exclusion range, without the IOMMU 185 checking and translating those DMA access requests (i.e., translation and checking is disabled at the IOMMU for that range of addresses). In this sense, any DMA access requests (or transactions) from a peripheral device 170 that are within the exclusion range are "excluded" from translation and address checks. In short, this allows the peripheral devices 170 to access (e.g., read from or write to) portions of the system memory 160 that are within the defined exclusion range without translation and access checks. This allows memory transactions to move more quickly through the IOMMU with lower latency or delay since there is less processing due to the fact that address checks and translation are not needed.

Inverted Exclusion Range

In accordance with some of the disclosed embodiments, security of the computer system 100 is improved by implementing an "inverted" exclusion range to protect the special sections of system memory 160 from being accessed by the peripheral devices 170. In accordance with some of the disclosed embodiments, security of the computer system can also be further improved by implementing a similar "inverted" exclusion range to protect the special sections of system memory 160 from being accessed by the processor core(s) 114. In one embodiment, this inverted exclusion range mechanism can be applied, for instance, at the IOMMU 185 to eliminate the need for the second, distinct SP MMU block 190 that is described above. Like the second SP MMU block 190, implementing the inverted exclusion range mechanism at IOMMU 185 can prevent access requests by a peripheral device 170 to a special section (or restricted range of addresses) in the system memory 160. Even if other functions of the IOMMU 185 are programmed to allow a given access, the inverted exclusion range will operate to block the access to the restricted range of addresses in the system memory 160. This can help prevent peripheral devices 170 from viewing and/or corrupting that portion of system memory 160. For example, this inverted exclusion range mechanism can be used by secure or trusted software, for example, to keep secrets and trusted code or data. It can be used to prevent peripheral devices 170 from accessing special sections of system memory 170 that hold information, such as System Management Mode (SMM) code and data, as one non-limiting example.

One embodiment that can be used to implement the inverted exclusion range mechanism will now be described with reference to FIGS. 3 and 4.

Figure 3:
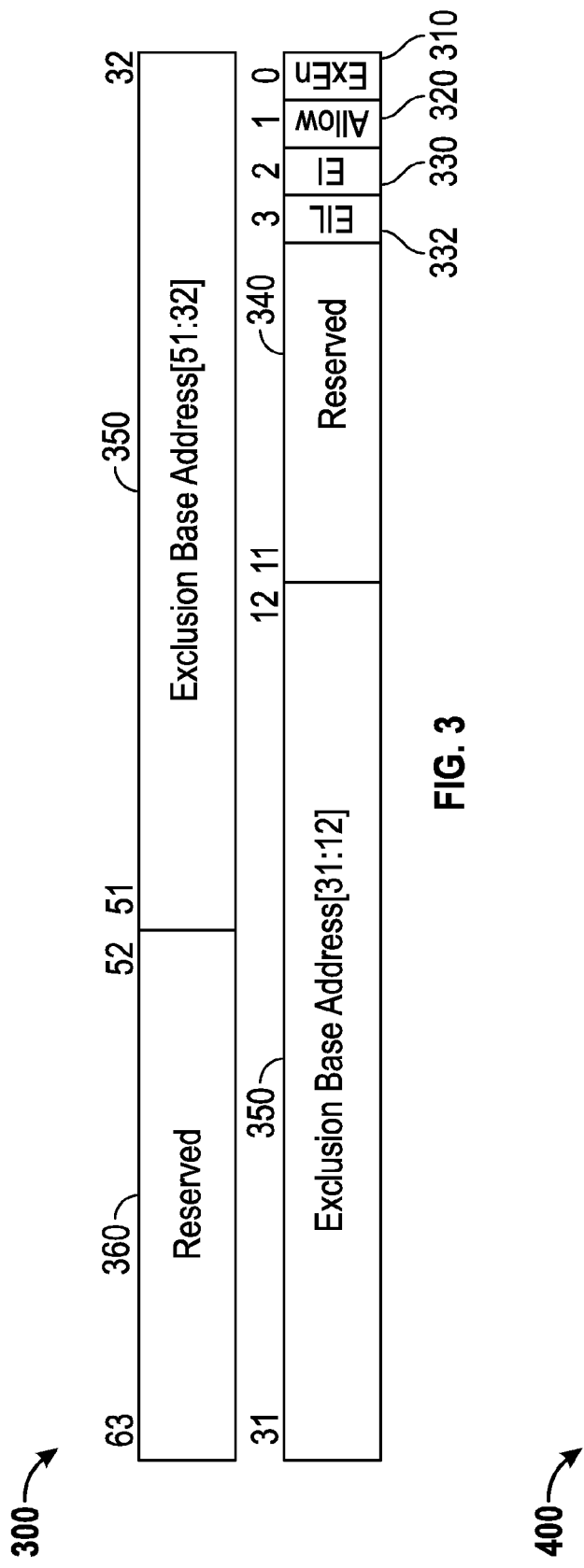
FIG. 3 is a block diagram of an invertible exclusion base address register in accordance with one exemplary implementation of some of the disclosed embodiments.

FIG. 3 is a block diagram of an invertible exclusion base address register 300 in accordance with one exemplary implementation of some of the disclosed embodiments. FIG. 3 shows modifications that can be made to the standard definition of the base address register in the current IOMMU specification to implement the inverted exclusion range mechanism.

The invertible exclusion base address register 300 includes a ExEn bit 310, an allow bit 320, a reserved field 340 (at bits 11 . . . 2) that includes an exclusion invert (EI) bit 330 at bit 2 and an exclusion invert lock (EIL) bit 332 at bit 3, and exclusion range base address field 350 (at bits 51 . . . 12), and another reserved field 360 (at bits 63 . . . 52).

The ExEn bit 310 is used to enable or disable the exclusion range mechanism. As illustrated in FIG. 3, when the ExEn bit 310 is set to 0 the exclusion range mechanism is disabled, and when the ExEn bit 310 is set to 1 the exclusion range mechanism is enabled. The allow bit 320 is used to indicate whether or not use of the exclusion range mechanism is allowed. When the allow bit 320 is set to 1, all access requests from a particular peripheral device 170 to the exclusion range are forwarded to system memory 160 without being translated or checked for access rights. When the allow bit 320 is set to 0, access requests from a particular peripheral device 170 are translated and checked for access rights.

In accordance with some of the disclosed embodiments, the exclusion invert (EI) bit 330 (at bit 2) is a new a control bit that is used to "invert" the definition of the exclusion range. When the exclusion invert (EI) bit 330 is set to 0, the exclusion range would operate as defined in the current IOMMU specification such that access requests by peripherals to addresses in system memory 160 that correspond to the exclusion range are not checked or translated. When the exclusion invert (EI) bit 330 is set to 1, the exclusion range mechanism would block peripheral devices from accessing the range of addresses in system memory 160 that correspond to the exclusion range that is defined by FIGS. 3 and 4. The exclusion invert lock (EIL) bit 332 (at bit 3) is optional and used in some implementations. The exclusion invert lock (EIL) bit 332 serves to lock or "freeze" the settings in the register 300 so that nefarious software cannot change it. The exclusion invert lock (EIL) bit 332 reverts to unlocked only upon a system-reset signal originating in hardware.

The exclusion range base address field 350 (at bits 51 . . . 12) specifies an aligned base address of the exclusion range. The exclusion range base address field 350 defined by the register 300 is used to specify a base address at which the exclusion range starts. The reserved field 360 (at bits 63 . . . 52) is reserved for future use.

Figure 4:
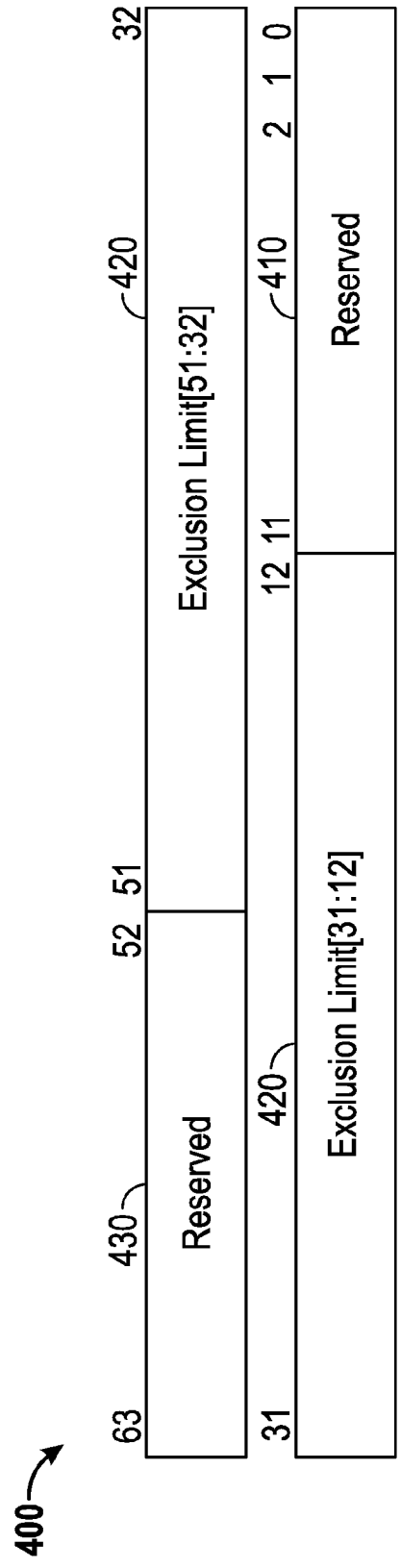
FIG. 4 is a block diagram of an invertible exclusion limit register in accordance with one exemplary implementation of some of the disclosed embodiments.

FIG. 4 is a block diagram of an invertible exclusion limit register 400 in accordance with one exemplary implementation of some of the disclosed embodiments. FIG. 4 shows the standard definition of the exclusion limit register in the current IOMMU specification. The invertible exclusion limit register 400 is used to record the length of the exclusion range, and includes a reserved field 410 (at bits 11 . . . 0) that is reserved for future use, an exclusion range limit address field 420 (at bits 51 . . . 12), and another reserved field 430 (at bits 63 . . . 52) that is reserved for future use. The exclusion range ends at an address that is the sum of the base address (specified by the exclusion range base address field 350) plus a limit that is specified by the exclusion range limit address field 420.

It should be understood that many variations are possible based on the disclosure herein. Although features and elements are described above in particular combinations, each feature or element may be used alone without the other features and elements or in various combinations with or without other features and elements. The methods provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data (such instructions capable of being stored on a computer readable media). The results of such processing may be maskworks that are then used in a semiconductor manufacturing process to manufacture a processor which implements aspects of the disclosed embodiments.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer system, comprising:
    a peripheral device;
    a host bridge;
    a system memory coupled to the host bridge via a first access bus;
    a security processor coupled to the host bridge via a memory access bus that allows the security processor to access system memory and to access the peripheral device;
    a first security processor memory management unit coupled between the peripheral device and the host bridge;
    a processor comprising a processor core and a memory management unit (MMU), wherein the security processor is connected to the processor core via a management bus; and
    a second security processor memory management unit separate from the first security processor memory management unit, the second security processor memory management unit coupled between the processor and the host bridge via a memory access bus, and connected to the security processor by a control bus, wherein the management bus, the control bus, and the memory access bus are separate buses;
    wherein the security processor programs the first security processor memory management unit via the memory access bus to specify a first restricted range of physical addresses in the system memory that the peripheral device is not permitted to access,
    wherein the security processor programs the second security processor memory management unit via the control bus to specify a second restricted range of physical addresses in the system memory that the processor core is not permitted to access, and
    wherein the first security processor memory management unit processes access requests, from the peripheral device, to access system memory; and denies access requests from the peripheral device that are determined to be within the first restricted range.

2. A computer system according to claim 1, wherein the first security processor memory management unit allows access requests from the peripheral device that are determined not to be within the first restricted range.

3. A computer system according to claim 1,
    wherein the second security processor memory management unit processes access requests, from the processor core, to access system memory; and denies access requests from the processor core that are determined to be within the second restricted range.

4. A computer system according to claim 3, wherein the second security processor memory management unit allows access requests from the processor core that are determined not to be within the second restricted range.

5. A computer system according to claim 3, wherein a respective access request from the processor core is selected from the group consisting of: a request to write data to a particular physical address in system memory, and a request to read data from a particular physical address in system memory.

6. A computer system according to claim 3, wherein the second restricted range is the same as the first restricted range.

7. A computer system according to claim 3, wherein the second restricted range is different that the first restricted range.

8. A computer system according to claim 3, wherein the security processor directly controls the processor core over the management bus to stall the processor core from booting up.

9. A computer system according to claim 3, wherein the memory access bus is coupled to bypass the second security processor memory management unit such that communications from the security processor do not traverse through the second security processor memory management unit.

10. A computer system according to claim 3, further comprising:
    a first memory, communicatively coupled to the security processor, the first memory storing instructions, that when executed by the security processor, cause security processor to:
    generate a first signal that is communicated to the processor core over the management bus, wherein the first signal causes the processor core to enter a stall mode such that the processor core is not permitted to access a host bridge that couples the processor core to the system memory;

configure the first restricted range of physical addresses in the system memory and the second restricted range of physical addresses in the system memory;

program the first security processor memory management unit via the memory access bus to specify the first restricted range of physical addresses in the system memory that the peripheral device is not permitted to access; and program the second security processor memory management unit via the control bus to specify the second restricted range of physical addresses in the system memory that the processor core is not permitted to access; and generate a second signal that is communicated to the processor core over the management bus, wherein the second signal releases the processor core from the stall mode so that the processor core is permitted to access a host bridge that couples the processor core to the system memory.

11. A computer system according to claim 10, wherein the first memory is connected exclusively to the security processor.

12. A computer system according to claim 10, wherein the first memory is integrated in the same integrated circuit package as the security processor.

13. A computer system according to claim 10, wherein the first memory is a reserved portion of the system memory that is reserved for the exclusive use by the security processor.

14. A computer system according to claim 1, further comprising:
an input/output hub; and
an input/output memory management unit (IOMMU) that is coupled to the peripheral device, wherein the IOMMU checks and translates direct memory access (DMA) requests from the peripheral device to access the system memory, and wherein the memory access bus allows the security processor to access the IOMMU.

15. A computer system according to claim 14, wherein the first security processor memory management unit integrated with the IOMMU in the input/output hub.

16. A computer system according to claim 14, wherein the first security processor memory management unit is a separate hardware module that is independent of the IOMMU and the input/output hub, and is coupled to the IOMMU over a bus.

17. A computer system according to claim 16, wherein the IOMMU is a separate hardware module that is independent of the input/output hub, and is coupled to the input/output hub over a separate bus.

18. A computer-implemented method for configuring a computer system to prevent access to a restricted range of physical addresses in a system memory of the computer system, the computer-implemented method comprising:
generating, by a security processor, a first signal that is communicated to a processor core that causes the processor core to enter a stall mode such that the processor core is not permitted to access a host bridge that couples the processor core to the system memory;

configuring the restricted range of physical addresses in the system memory;

programming, by the security processor a first security processor memory management unit that is connected to the security processor by a memory access bus, the programming comprising programming the first security processor memory management unit to specify at least some of physical addresses in the restricted range of physical addresses that a peripheral device is not permitted to access; and programming, by the security processor a second security processor memory management unit, the second security processor memory management unit coupled between the processor core and the host bridge via a memory access bus and connected to the security processor by a control bus, the programming comprising programming the second security processor memory management unit to specify at least some of physical addresses in the restricted range of physical addresses that the processor core is not permitted to access, wherein the memory access bus and the control bus are separate buses; and generating, by the security processor, a second signal that is communicated to the processor core that releases the processor core from the stall mode so that the processor core is permitted to access a host bridge that couples the processor core to system memory.

19. A computer system, comprising:
a security processor;
a memory access bus;
a control bus, wherein the memory access bus and the control bus are separate buses;
a first security processor memory management unit connected to the security processor by the memory access bus;
a peripheral device coupled to the first security processor memory management unit;
a second security processor memory management unit connected to the security processor by the control bus; and
a processor coupled to the second security processor memory management unit, wherein the second security processor memory management unit is coupled between the processor and the memory access bus;
wherein the security processor programs the first security processor memory management unit via the memory access bus to specify a first restricted range of physical addresses that the peripheral device is not permitted to access; and
wherein the security processor programs the second security processor memory management unit via the control bus to specify a second restricted range of physical addresses that the processor is not permitted to access.

* * * * *